(12) United States Patent
Diethorn et al.

(10) Patent No.: US 9,107,001 B2
(45) Date of Patent: Aug. 11, 2015

(54) EARPHONES HAVING CONFIGURABLE MICROPHONE ARRAYS

(71) Applicant: MH Acoustics, LLC, Summit, NJ (US)

(72) Inventors: Eric J. Diethorn, Long Valley, NJ (US); Gary W. Elko, Summit, NJ (US); Jens M. Meyer, Fairfax, VT (US); Tomas F. Gaensler, Warren, NJ (US)

(73) Assignee: MH Acoustics, LLC, Summit, NJ (US)

( * ) Notice: Subject to any disclaimer, the term of this patent is extended or adjusted under 35 U.S.C. 154(b) by 0 days.

(21) Appl. No.: 14/348,629

(22) PCT Filed: Sep. 26, 2013

(86) PCT No.: PCT/US2013/061789
§ 371 (c)(1),
(2) Date: Mar. 31, 2014

(87) PCT Pub. No.: WO2014/055312
PCT Pub. Date: Apr. 10, 2014

(65) Prior Publication Data
US 2015/0201271 A1    Jul. 16, 2015

Related U.S. Application Data

(60) Provisional application No. 61/708,826, filed on Oct. 2, 2012.

(51) Int. Cl.
*H04R 1/10* (2006.01)
*H04M 1/05* (2006.01)

(52) U.S. Cl.
CPC ............... *H04R 1/1091* (2013.01); *H04M 1/05* (2013.01); *H04R 1/10* (2013.01); *H04R 2201/107* (2013.01)

(58) Field of Classification Search
USPC ......... 381/356–358, 365, 369, 182, 370, 375, 381/381, 384
See application file for complete search history.

(56) References Cited

U.S. PATENT DOCUMENTS

| | | |
|---|---|---|
| 2002/0009203 A1 | 1/2002 | Erten |
| 2007/0165875 A1 | 7/2007 | Rezvani et al. |
| 2011/0033065 A1 | 2/2011 | Johnson |
| 2011/0129097 A1 | 6/2011 | Andrea |
| 2012/0020485 A1 | 1/2012 | Visser et al. |

FOREIGN PATENT DOCUMENTS

| | | |
|---|---|---|
| EP | 2461553 A1 | 6/2012 |
| WO | WO2007017810 A2 | 2/2007 |

OTHER PUBLICATIONS

International Search Report and Written Opinion; Mailed Feb. 11, 2014 for the corresponding PCT Application No. PCT/US2013/061789.

*Primary Examiner* — Suhan Ni
(74) *Attorney, Agent, or Firm* — Mendelsohn, Drucker & Dunleavy, P.C.; Steve Mendelsohn

(57) ABSTRACT

Accessories for a telephone include at least one earphone and at least one microphone array having multiple microphones used to generate outgoing audio signals for (i) processing by a signal processor and (ii) transmission by the telephone. In one embodiment, two earphones are connected by two corresponding wires, and two microphone arrays, respectively connected to the two wires, are mechanically and electronically configurable in a plurality of use modes to generate outgoing audio signals for processing by the signal processor. The use modes include one or more and possibly all of a single-sided mode, a two-sided mode, an enhanced directivity mode, a stereo recording mode, a multichannel recording mode, a conference mode, and a two-dimensional-array mode, where one of the use modes is automatically detected by the signal processor based on the audio signals generated by the two microphone arrays.

31 Claims, 3 Drawing Sheets

SINGLE-SIDED MODE

TWO-SIDED MODE

ENHANCED DIRECTIVITY MODE

STEREO RECORDING MODE

CONFERENCE MODE

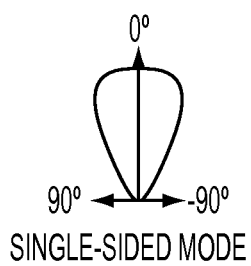
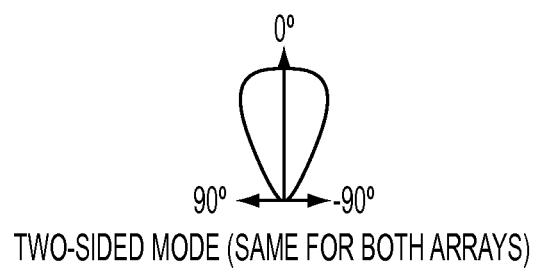
FIG. 2A  SINGLE-SIDED MODE
FIG. 2B  TWO-SIDED MODE (SAME FOR BOTH ARRAYS)
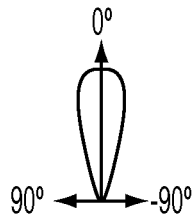
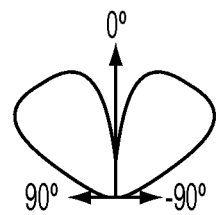
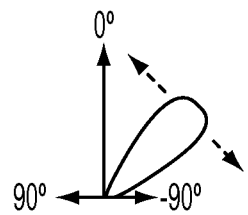
FIG. 2C  ENHANCED DIRECTIVITY MODE
FIG. 2D  STEREO RECORDING MODE
FIG. 2E  CONFERENCE MODE

EARPHONES HAVING CONFIGURABLE MICROPHONE ARRAYS

CROSS-REFERENCE TO RELATED APPLICATIONS

This application claims the benefit of the filing date of U.S. provisional application no. 61/708,826, filed on Oct. 2, 2012, the teachings of which are incorporated herein by reference in their entirety.

BACKGROUND

1. Field

The present disclosure relates to audio products and, more specifically but not exclusively, to earphones and headphones having built-in microphones, such as those used for telephony applications.

2. Description of the Related Art

This section introduces aspects that may help facilitate a better understanding of the disclosure. Accordingly, the statements of this section are to be read in this light and are not to be understood as admissions about what is prior art or what is not prior art.

Cellular smartphones provide a wide variety of audio functionality to users, including telephony, voice-memo recording, audio-video recording, and a voice interface to automated speech-recognition engines used in dictation and automated voice assistants. Almost all smartphones can be used with earphones, also known as in-ear headphones, earbuds, or headsets.

Many earphone designs to date contain a single omnidirectional microphone embedded in one of the earphone wires. This microphone is usually located in one of the earphone wires that connects to the left or right earphone transducer. For example, in the earphone designs by Apple, Beats, and Bose, to name only three, the microphone is located in the control capsule that provides the user with a set of audio controls. The control capsule on most earphones is located on either the left or right earphone wire and is placed along the wire so that, when the earphones are worn normally, the microphone is in line with the user's mouth. Such configurations limit the transmission quality of the user's speech as well as the accuracy of speech-recognition engines when used with automated voice assistants such as Apple's Siri and Google's Google Now.

SUMMARY

In one embodiment, the present invention is an accessory system for a telephone. The accessory system comprises (a) at least one earphone configured to receive from the telephone incoming audio signals for rendering by the at least one earphone and (b) at least one microphone array comprising a plurality of microphones used to generate outgoing audio signals for (i) processing by a signal processor and (ii) transmission by the telephone.

BRIEF DESCRIPTION OF THE DRAWINGS

Embodiments of the present invention are illustrated by way of example and are not limited by the accompanying figures, in which like references indicate similar or identical elements. Elements in the figures are illustrated for simplicity and clarity and have not necessarily been drawn to scale.

FIGS. 2(A)-2(E) graphically illustrate prototypical beamformer sensitivity patterns associated with the five modes of FIGS. 1(A)-1(E), respectively;

DETAILED DESCRIPTION

Figure 1A:
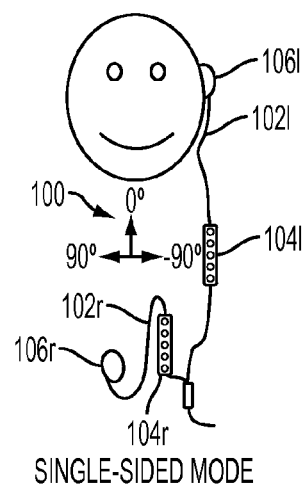
FIGS. 1(A)-1(E) illustrate five different modes of using an exemplary earphone/microphone accessory system according to one embodiment of the disclosure.

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components.

This disclosure is related to an earphone design that incorporates microphone arrays in the earphone's wires or in the earphones themselves or both to enhance the transmission quality of the user's speech for the purpose of improving the quality of telephone calls and for improving the accuracy of speech-recognition engines when used with automated voice assistants such as Apple's Siri. The earphone design described here incorporates a microphone array in one or both of the left and right wires leading to the earphone's loudspeaker transducers. When two microphone arrays are deployed, each array can be used separately, or the two arrays can be mechanically configured to result in a longer and more-effective array for enhanced transmit-speech quality, particularly in noisy environments. The two arrays can also be arranged for use in stereo recording, such as might be used in making a video recording of a musical performance.

Compared to a single omnidirectional microphone, a microphone array has two or more omnidirectional (or directional) microphone elements arranged in a line, a two-dimensional grid, or a three-dimensional frame or solid. The nominal inter-microphone spacing may be chosen based on the physics of sound propagation such that the mathematical combination of the signals from all microphones produces an acoustic sensitivity that is greater than, and more directional than, the signal from a single omnidirectional element or single directional element. The sensitivity beampattern resulting from the microphone array can be designed to have maximum sensitivity in the direction of the user's mouth while minimizing sound contributions from all other directions, and in this way a microphone array can greatly enhance the quality of a user's speech by increasing the speech-signal-to-noise ratio beyond that provided by a single omnidirectional or directional microphone element.

The mathematics and engineering of microphone arrays is a mature science. See, e.g., S. L. Gay and J. Benesty, eds., *Acoustic Signal Processing for Telecommunications*, Kluwer Academic Publishers, Boston, 2000; M. Brandstein and D. Ward, eds., *Microphone Arrays—Signal Processing Techniques and Applications*, Springer-Verlag, Berlin, 2001; and J. Benesty, J. Chen, Y. Huang, eds., *Microphone Array Signal Processing*, Springer-Verlag, Berlin, 2008, the teachings of all of which are incorporated by reference herein in their entirety. This disclosure focuses on the mechanical features of an earphone accessory containing one or more microphone arrays that can be configured for different speech transmission and sound recording use scenarios.

Use Modes

FIGS. 1(A)-1(E) illustrate five different modes of using an exemplary earphone/microphone accessory system 100 according to one embodiment of the disclosure. In this embodiment, both the left and right earphone wires 102*l* and 102*r* have embedded along their lengths a capsule containing a line array 104*l/r* of two or more omnidirectional or directional microphones. In the illustrated implementation, each array contains five omnidirectional microphones. These microphones could be traditional electret capsules, MEMS microphones, or another suitable sound-transducing capsule design. The capsules are generally located in the vicinity of the user's mouth, but need not be.

For all use modes, the mathematical combination of microphone signals in one or both arrays for the purpose of generating a directional beampattern could take place centrally where one processing unit has access to all microphone signals. Typically, but not necessarily, this central unit would be the smartphone (not shown). Alternatively, the beamforming could be implemented local to the arrays where special-purpose processors (e.g., digital signal processors) are (i) embedded with the array capsules themselves in shared housing or (ii) separate from the array capsules in their own housing and, in either case, not shown in the figures.

FIGS. 2(A)-2(E) graphically illustrate prototypical sensitivity patterns associated with the five modes of FIGS. 1(A)-1(E), respectively. The sensitivity is greatest in the zero-degree bearing direction, which is the direction towards the user's mouth as shown in FIG. 1. Narrower patterns indicate an acoustic sensitivity that is less sensitive in all directions other than the direction of maximum sensitivity.

Depending on the particular implementation, the arrays 104*l/r* and the earbuds 106*l/r* could similarly or differently communicate with the smartphone via either a wired link or a wireless link. If the arrays communicate wirelessly, they may be located anywhere including remotely from the earbuds and any earbud wires, such as, for example, clipped to the user's clothing.

Figure 3A:
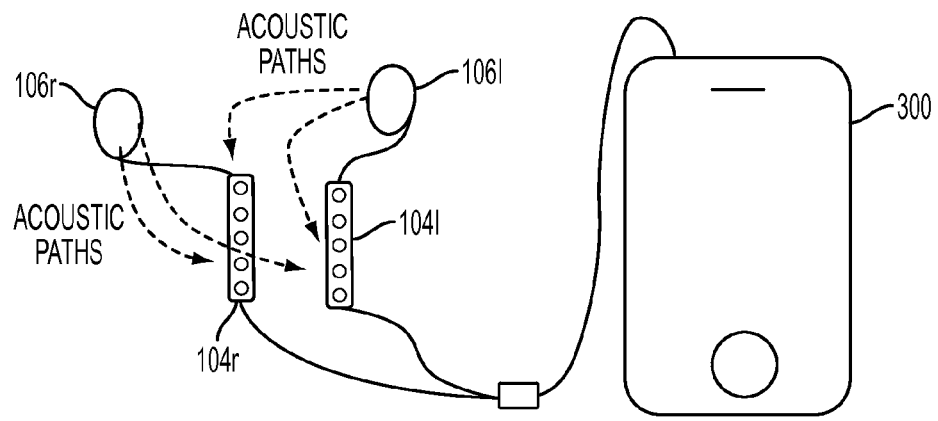
FIG. 3(A) illustrates the exemplary accessory system of FIG. 1 configured to a cellphone.
Figure 3B:
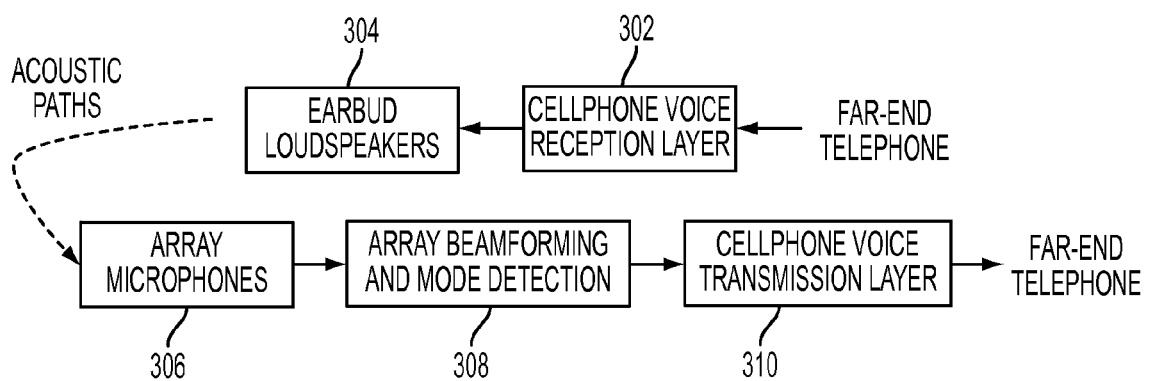
FIG. 3(B) shows a simplified block diagram of the configuration of FIG. 3(A).

FIG. 3(A) illustrates the exemplary earphone/microphone accessory system 100 of FIG. 1 configured to a cellphone 300, and FIG. 3(B) shows a simplified block diagram of the configuration of FIG. 3(A). As shown in FIG. 3(B), voice reception layer 302 of cellphone 300 receives and processes an incoming telephone signal from a far-end telephone and sends the resulting incoming audio signals for rendering by the loudspeakers 304 of earbuds 106*l/r* into audible acoustic sounds for the user to hear. In addition, microphones 306 of microphone arrays 104*l/r* convert audible acoustic signals into outgoing audio signals for appropriate signal processing by array beamformer/mode detector 308 and then by the voice transmission layer 310 of cellphone 300 for transmission towards the far-end telephone. Depending on the implementation, array beamformer/mode detector 308 might or might not be implemented within cellphone 300. As indicated in both FIGS. 3(A) and 3(B), depending on the particular situation, acoustic signals generated by the earbud loudspeakers can get picked up by the array microphones.

Single-Sided Mode

In the single-sided mode of FIGS. 1(A) and 2(A), only one of the earphones (e.g., 106*l*) is inserted in the user's ear. The microphone array 104*l* associated with that earphone 106*l* is activated, and beamforming is used to maximize the sensitivity pattern of the array in the direction of the user's mouth. The other array 104*r* is not used in this mode.

Any of a number of methods could be used to automatically determine which of the two earphones 106*l* and 106*r* is inserted in the user's ear, and therefore which of the two arrays to use for speech transmission. For example, the earphones could contain a microphone-like transducer that detects the acoustic coupling from the earphone's loudspeaker. This coupling is greater when the earphone is inserted in the user's ear than when it is not, because the ear canal serves as a closed acoustic resonator. Alternatively, any number of voice-activity detection methods could be employed to determine which of the two arrays, left or right, provides the highest speech activity measure or rating when the user is talking, and that array is then selected for speech transmission. In yet another alternative, accelerometers could be embedded in the earphones and/or earphone wires and/or earphone control box. The direction of gravity as reported by the accelerometers could be used to determine the orientation of the earbuds relative to the wires and arrays, and from that, which earbud and corresponding array are predominately parallel to a normal to Earth's surface (indicating a higher likelihood of being worn compared to the other earbud). Another possibility could be to use the phase delay (or equivalently group delay) from the acoustic and vibration sources (talker's mouth, vibration sensor signal, and/or earbud loudspeaker signal) to triangulate the position of the microphones that make up the array in order to compute the array geometry and orientation. Other techniques are also possible.

Two-Sided Mode

Figure 1B:
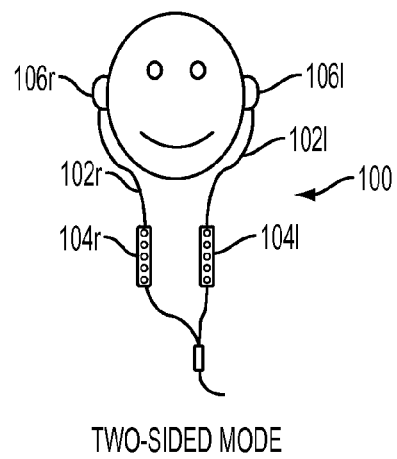

In the two-sided mode of FIGS. 1(B) and 2(B), both earphones 106*l* and 106*r* are inserted in the user's ears, and either or both arrays 104*l* and/or 104*r* could be selected for the transmission of speech. For example, if one of the arrays is more dominated by environmental noise, such as wind noise, the less noisy array could be automatically selected, with the more noisy array de-activated.

To determine whether the earphones are in two-sided mode or one-sided mode, the acoustic coupling described in the previous section could be thresholded for both arrays. If the acoustic coupling for both arrays is greater than the specified threshold level, then the earphones can be assumed to be in two-sided mode. If the acoustic coupling for only one array is greater than the specified threshold level, then the earphones can be assumed to be in one-sided mode, with the earphone having the greater acoustic coupling being the inserted earphone and the other earphone being disabled.

Enhanced Directivity Mode

Figure 1C:
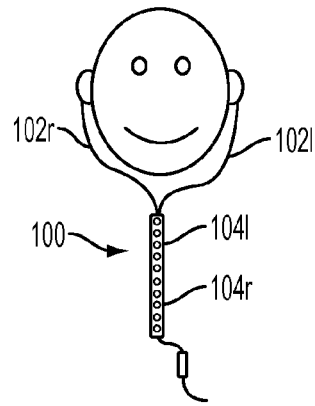

In the enhanced directivity mode of FIGS. 1(C) and 2(C), the two arrays 104*l* and 104*r* are mechanically configured to result in a longer continuous line array of microphones. (For two- or three-dimensional microphone array geometries, a larger grid array or larger array surface results from connecting the two arrays.) It is well known that a larger array can be used to result in a directivity gain towards the user's mouth that exceeds the directivity gain of each single array. This use mode would be particularly beneficial in noisy environments, where the user wishes to benefit from improved transmission speech quality. For example, this mode of the array could be used while driving in a car or when the user is at a noisy restaurant.

The two arrays could be connected by embedding magnets in the capsule ends, or a physical connector of any of various types could be used. In addition to magnets or physical connectors, the ends of the capsules could contain electrical connections to provide a means to combine the electrical signals from the two arrays. For example, this might be necessary if the processing is implemented local to the arrays. The electrical connections would typically consist of power, ground, and a microphone-signal bus.

For example, using the implementation of FIG. 1(C), to utilize two arrays 104*l* and 104*r* of five microphones each, a signal bus that can combine ten microphone signals would be used. For microphone elements providing an output signal in analog format, this can be accomplished using ten wires, with at least seven connections established between the two arrays (power, ground, and five microphone signals). Alternatively, for digital-output microphones, one wire serving as a time-division multiplexed bus could be used to multiplex the five microphone signals, with only three connections established between the arrays (power, ground, and one digital bus).

The user could use an application on the smartphone to select Enhanced Directivity mode, or the act of connecting the two arrays together could automatically signal to the smartphone, or processors embedded in the array capsules, to configure the beamforming algorithm for enhanced directivity.

Stereo Recording Mode

Figure 1D:
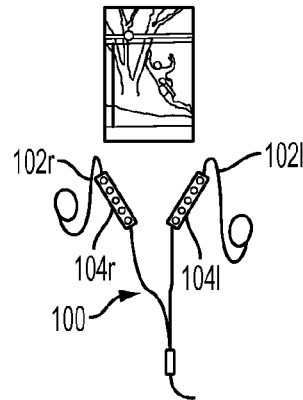

In the stereo recording mode of FIGS. 1(D) and 2(D), the two arrays 104*l* and 104*r* are used in an audio-video or audio-only recording configuration to capture a two-channel, stereo recording of a performance or other event. The two earphones may be worn by the user or held or otherwise arranged to point towards the performance in a left-of-stage and right-of-stage orientation. In this way, the sensitivity patterns of the two arrays are oriented as in FIG. 2(D), and the resulting stereo recording captures a more-realistic presentation of the event than achievable using a single omnidirectional microphone.

Alternative embodiments may also be able to support one or more surround or other multichannel sound (e.g., 5.1) recording modes. For instance, with two arrays arranged in a "V", "T", or "+" configuration, it is possible to form multiple beams pointing in directions that would be appropriate for surround sound recording and playback. 5.1 surround playback systems have defined preferred loudspeaker locations. It would therefore be desirable to point multiple beams in the preferred 5.1 directions to achieve good spatial playback on the 5.1 system. In certain embodiments, the audio signals generated by all of the different microphones in the arrays could be individually recorded in memory (e.g., in the smartphone) and used for later postprocessing to give the user control over the desired beampatterns that suit desired spatial playback characteristics.

For best results, it would be desirable to know what the actual user-selected microphone array geometry was. One could achieve this by detecting the magnetic field strength at various points along the arrays and using this information to determine the overall array geometry between two or more arrays. It is conceivable that one could place magnets in a way that constrains the microphone array geometry to a few available geometries. From one or more magnetic sensors configured to detect the residual magnetic fields or one or more other strategically placed pressure sensors, one could therefore detect which discrete geometry was selected.

Another possibility to detect the array geometry and/or orientation is to use an earbud's loudspeaker to output a known acoustic test signal and use some or all of the resulting microphone signals to determine the array geometry/orientation. Processing could compute the phase delay and/or amplitude differences in the acoustic test signal traveling from the loudspeaker to the different microphones and derive the array geometry/orientation from these phase delay and/or amplitude differences. The known acoustic test signal could be purposefully designed to be inaudible to humans. In some implementations, the inaudible audio signals could be dynamically designed to be masked by ambient sound. Note that, as used in this specification, the term "inaudible" covers sounds that are outside the human listening range in terms of signal frequencies as well as sounds that are otherwise undetectable such as sounds that would be masked to humans by background noise in the listening environment.

Conference Mode

Figure 1E:
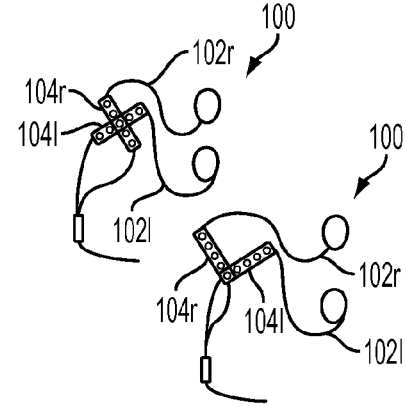

In the conference mode of FIGS. 1(E) and 2(E), the two microphone arrays 104*l* and 104*r* are configured and used as a transmitting, beamformed microphone array in a two-way speakerphone call. The smartphone's loudspeaker (not shown), or the earphone loudspeakers 106*l* and 106*r* if capable, are used as the loudspeaker that renders audio received by the phone from the other party in the two-way call. FIG. 1(E) shows two possible arrangements of the two arrays. The arrays are either overlapped or adjoined at (generally) right angles to each other to result in a two-dimensional microphone array structure. Such an arrangement facilitates beamforming and beamsteering at arbitrary angles in the entire 360-degree space of the plane containing the two arrays. FIG. 2(E) depicts the rotatable beampattern possible with such an arrangement.

Geometries other than the X- or "+"-shaped and the L- or V-shaped geometries of FIG. 1(E) are possible, such as a T-shaped geometry in which the end of one array is connected to the middle of the other array.

Other Modes

The enhanced directivity mode of FIGS. 1(C) and 2(C) places the two arrays end-to-end to form a linear array of twice the length of each array. As discussed, the longer baseline array can be exploited to improve overall beam directivity (narrow beam) in the direction of the user's mouth. Instead of an end-to-end configuration, the two microphone arrays could alternatively be adjoined side-by-side to result in a two-dimensional array having two microphones in one dimension and five in the other (for the five-microphone arrays shown in FIG. 1). Those skilled in the art understand that such two-dimensional arrays can be exploited, mathematically, to produce beampattern and beam directivity characteristics that differ from a one-dimensional linear array, providing advantages in certain use scenarios. For example, a differential microphone beamformer designed for a linear array of microphones, while benefitting from high directivity towards the user's mouth, is not steerable off the 0-degree axis. A two-dimensional differential array, in contrast, offers a tradeoff between beampattern directivity and beam direction.

A special case of the single-sided mode is when the user holds the array corresponding to the earphone that is not inserted into or otherwise connected to the ear, close to his/her mouth. A speech-activity-based metric would then select the better of the two arrays, and not necessarily the one side whose earphone is on the ear. This mode is essentially a hybrid of single-sided mode and the two-sided mode.

Although the disclosure has been described in the context of smartphone accessory systems having two earphones, in alternative embodiments, an accessory system might have only one earphone.

What is claimed is:

1. An accessory system for a telephone, the accessory system comprising:
    at least one earphone configured to receive from the telephone incoming audio signals for rendering by the at least one earphone; and
    at least first and second microphone arrays respectively configured to generate first and second sets of audio signals, and each microphone array comprising a plurality of microphones used to generate outgoing audio signals for (i) processing by a signal processor and (ii) transmission by the telephone, wherein the first and second microphone arrays are mechanically and electronically configurable in a plurality of use modes to generate the audio signals for processing by the signal processor.

2. The system of claim 1, wherein the signal processor is configured to determine at least one of geometry and orientation of the at least one microphone array by characterizing at least one of phase delay differences and amplitude differences between different audio signals generated by different microphones in the at least one microphone array in response to an acoustic test signal generated by the at least one earphone.

3. The invention of claim 2, wherein the earphone is configured to render the acoustic test signal to be inaudible to humans.

4. The system of claim 1, wherein memory is configured to store audio signals generated by each microphone in the at least one microphone array for subsequent processing by the signal processor.

5. The system of claim 1, wherein the at least one microphone array or the signal processor communicates with the telephone via a wireless link.

6. The system of claim 1, wherein the at least one microphone array or the signal processor communicates with the telephone via a wired link.

7. The system of claim 1, wherein the at least one microphone array is co-located with the at least one earphone.

8. The system of claim 1, wherein the at least one microphone array is located remote from the at least one earphone and from any wire corresponding to the at least one earphone.

9. The system of claim 1, comprising first and second earphones connected by corresponding first and second wires, wherein each microphone array is configured to a different one of the first and second wires.

10. The system of claim 1, wherein each of the first and second microphone arrays is a linear array of two or more microphones.

11. The system of claim 1, wherein the plurality of use modes comprises a single-sided mode in which only one of the first and second microphone arrays is selected for use in generating the audio signals for further processing by the signal processor.

12. The system of claim 11, wherein the signal processor detects the single-sided mode by determining that only one set of audio signals has acoustic coupling greater than a specified threshold level.

13. The system of claim 1, wherein the plurality of use modes comprises a two-sided mode in which the first and second microphone arrays are both available for use in generating the audio signals for further processing by the signal processor.

14. The system of claim 13, wherein the signal processor detects the two-sided mode by determining that both sets of audio signals have acoustic coupling greater than a specified threshold level.

15. The system of claim 13, wherein the signal processor is configured to automatically select the audio signals from only one of the first and second microphone arrays for the further processing by the signal processor.

16. The system of claim 13, wherein the signal processor is configured to automatically select the audio signals from both of the first and second microphone arrays for the further processing by the signal processor.

17. The system of claim 1, wherein the plurality of use modes comprises an enhanced directivity mode in which the first and second microphone arrays are mechanically configured end to end and both microphone arrays are used in generating the audio signals for further processing by the signal processor.

18. The system of claim 1, wherein the plurality of use modes comprises a stereo recording mode in which the first and second microphone arrays are used in generating left and right stereo channels of audio signals for further processing by the signal processor.

19. The system of claim 1, wherein the plurality of use modes comprises a multichannel recording mode in which more than two microphone arrays are used in generating multiple channels of audio signals for further processing by the signal processor.

20. The system of claim 19, wherein the multichannel recording mode is a surround sound recording mode.

21. The system of claim 1, wherein the plurality of use modes comprises a conference mode in which the first and second microphone arrays are mechanically configured to form a two-dimensional arrangement and the first and second microphone arrays are both used in generating the audio signals for further processing by the signal processor.

22. The system of claim 21, wherein the first and second microphone arrays intersect at their middles to form an X- or "+"-shaped arrangement.

23. The system of claim 21, wherein the first and second microphone arrays intersect at their ends to form an L- or V-shaped arrangement.

24. The system of claim 21, wherein the first and second microphone arrays intersect at their middles to form a T-shaped arrangement.

25. The system of claim 1, wherein the plurality of use modes comprises a two-dimensional-array mode in which the first and second microphone arrays are mechanically configured side by side to form a new two-dimensional array of microphones and the first and second microphone arrays are both used in generating the audio signals for further processing by the signal processor.

26. The system of claim 1, wherein the signal processor automatically detects one of the use modes based on the first and second sets of audio signals generated by the first and second microphone arrays.

27. The system of claim 1, further comprising at least one of (i) one or more magnetic sensors and (ii) one or more pressure sensors configured to generate sensor signals used by the signal processor to determine a geometry formed by the first and second microphone arrays.

28. The system of claim 1, wherein the plurality of use modes comprises a single-sided mode, a two-sided mode, an enhanced directivity mode, a stereo recording mode, a multichannel recording mode, a conference mode, and a two-dimensional-array mode.

29. The system of claim 1, wherein the signal processor is part of the system.

30. The system of claim 1, wherein the signal processor is distinct from the system.

31. The system of claim 1, wherein the signal processor combines the audio signals from the plurality of microphones in the at least one microphone array to form a directional beampattern.

* * * * *